United States Patent [19]

Jones, Jr. et al.

[11] Patent Number: 4,461,182

[45] Date of Patent: Jul. 24, 1984

[54] LOAD MEASURING APPARATUS

[75] Inventors: Clarence O. Jones, Jr., Buffalo; William E. Vosteen, Waterport, both of N.Y.

[73] Assignee: Niagara Machine & Tool Works, Buffalo, N.Y.

[21] Appl. No.: 401,070

[22] Filed: Jul. 23, 1982

[51] Int. Cl.³ .......................... G01D 1/12; G01L 1/00
[52] U.S. Cl. .................................. 73/862.53; 73/770; 100/99; 324/130
[58] Field of Search ............ 73/1 R, 1 B, 770, 862.53; 100/99; 324/130

[56] References Cited

U.S. PATENT DOCUMENTS

| 2,924,968 | 2/1960 | Colten et al. ......................... 73/770 |
| 3,169,394 | 2/1965 | Vosteen et al. . |
| 3,680,365 | 8/1972 | Summers ...................... 73/862.53 X |
| 3,714,806 | 2/1973 | Berkey et al. .................. 324/130 X |
| 3,791,204 | 2/1974 | List et al. ........................ 324/130 X |
| 3,924,458 | 12/1975 | Woodworth et al. ............ 73/769 X |

FOREIGN PATENT DOCUMENTS 56-130627 10/1981 Japan ................................ 73/862.53

*Primary Examiner*—Charles A. Ruehl
*Attorney, Agent, or Firm*—Joseph P. Gastel; Martin LuKacher

[57] ABSTRACT

Apparatus which measures loads imposed on load carrying members, and particularly such members in presses, to indicate the peak load reached during a press cycle, has circuits for amplifying the electrical signal from a sensing device such as a strain gage bridge, a peak detector which provides an output representing the peak load, and a digital indicator. Zero setting is achieved by integrating and holding an offset voltage derived by an integrating circuit in negative feedback relationship with the circuit which amplifies the signals from the sensing device. Calibration of the apparatus for press factor is obtained by adjusting the gain of a variable gain stage in the amplifier. The peak detector is reset each press cycle when the load sensed bears a predetermined ratio to rated or full capacity load. Overloads are indicated by comparing the peak load detector output with an output representing rated or full capacity load and enabling an oscillator to flash the decimal point indicator of the display when the overload condition is sensed. The different modes of operation of the apparatus (press factor calibration, zero setting and operating) are selectively obtained by switching means including solid state switches connected separately to each circuit of the apparatus in response to control voltages obtained from a front panel switch. The apparatus provides a compact device for measuring loading.

9 Claims, 1 Drawing Figure

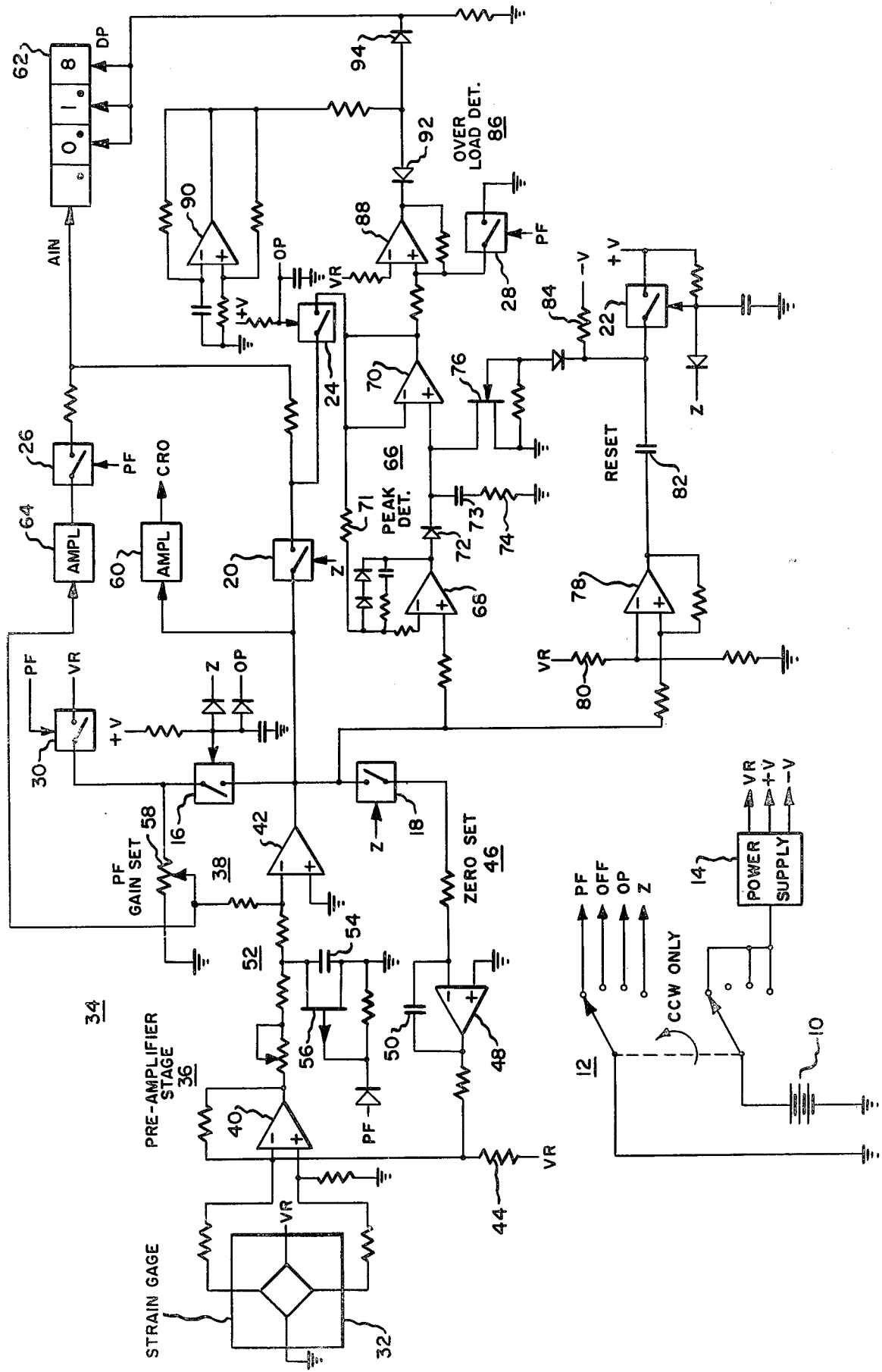

LOAD MEASURING APPARATUS

DESCRIPTION

The present invention relates to electrical signal measurement apparatus and particularly to apparatus for measuring the signals representing loads imposed on load carrying members during operation thereof.

The invention is especially suitable for use in an instrument to measure and indicate loads imposed on presses during their cyclical operation so as to determine if press capacity is properly utilized to meet job requirements.

Load measuring and control instruments which are especially adapted for use with presses which are presently available is represented by instruments known as the Load Analyzer, Press Load Monitor and Tonmeter II which are sold by Niagara Machine & Tool Works of Buffalo, New York. (See also U.S. Pat. No. 3,169,394). Such instruments as well as the apparatus provided by the present invention is designed to plug into a receptacle on the press or press brake, which is equipped with a strain sensing pickup device which is bonded to the frame thereof. This pickup or sensing device is usually a strain gage which provides an output signal corresponding to the load imposed on the frame, which is the load carrying member of the machine on which the loads are measured. Load measurement may be carried on by the machine tool operator. In order to simplify the operator's measurement making task and insure the accuracy and reliability of the measurement, it is desired that the instrument for making the measurement be small, extremely easy to operate and read measurements from, as well as substantially foolproof to operate.

It is a feature of the present invention to provide improved load measuring apparatus in which the foregoing objectives are obtained.

It is an ancillary feature of the invention to provide improved load measurement apparatus which may be calibrated and zero set to accommodate different presses and operating conditions in a simple, effective and reliable manner.

It is another ancillary feature of the present invention to provide improved load measuring apparatus which is automatically reset each operating cycle of the machine (e.g., the press) on which load measurements are being made, automatically and without operator intervention.

It is a further feature of the invention to provide digital indication of the measurement being made including the peak load reached during a cycle of operation with indications of overload conditions being reached made readily apparent on the indicator by flashing of an indicating element or elements thereon.

It is a still further feature of the invention to provide improved load measuring apparatus having a one knob control operative upon solid state switches for simplification of the operation of the apparatus.

Briefly described, apparatus for measuring the amplitude of an electrical signal produced by a sensing device, such as a strain gage on a load bearing member of a press or other machine has means for amplifying the signal and for indicating the amplitude thereof. Signal amplitude holding means is selectively connected in feedback relationship with the amplifying means to produce an output which drives the amplitude of the signal zero (zero setting) prior to the making of a measurement and which maintains the output, thereby continuing the zero offset, while the measurement is being made. The apparatus also includes improved means for resetting a peak detector which obtains a peak load output; such resetting occurring at the outset of an operating cycle by detecting when the output signal reaches a predetermined percentage or ratio of a full load output signal. A digital indicator reads the peak detector output. Overload indicating means includes a comparator and an oscillator. The comparator is responsive to the peak detector output for enabling the oscillator to cause the decimal point indicators of the digital display to flash when an overload is reached.

The foregoing and other features, objects and advantages of the present invention, as well as a presently preferred embodiment thereof, will become more readily apparent from a reading of the following description in connection with the accompanying drawing which is a sole FIGURE showing a schematic diagram of load measuring apparatus in accordance with the presently preferred embodiment of the invention.

Referring more particularly to the schematic diagram, the operating power for the apparatus is obtained from a battery 10. The apparatus may be small and portable, and it is adapted to be carried by the operator in one hand. A single knob operated, rotary control switch 12 is used to operate the instrument and obtain its various modes of operation. These modes of operation are the off mode where the battery 10 is disconnected from a power supply 14 by the lower bank of the control switch 12. This power supply 14 includes regulator circuits and voltage inverter circuits, which may be of conventional design, to provide output voltages of opposite polarity, $+V$ and $-V$ to operate the circuits of the apparatus. The power supply 14 also provides a reference voltage indicated as VR. The other operating mode of the apparatus are the press factor calibration, the operate and the zero set modes.

The control switch 12 is adapted to rotate in one direction only. This is the counterclockwise (CCW) direction as shown in the diagram. The switch 12 may have a spring return from zero position to the operate position. When each mode is selected, reference potential indicated as ground is applied to solid state switches in the system. These switches are shown in 16, 18, 20, 22, 24, 26, 28 and 30 in the diagram. They are available in integrated circuit form, thereby facilitating the packaging of the apparatus in a small, compact unit. The terminals of the upper bank of the switch 12, which selectively apply ground to the solid state switches 16 to 30 as well as other components of the circuits, are indicated as PF, OP and Z. Ground is effectivelya control voltage level which selectively connects the circuits through the solid state swithces. The switches are each indicated schematically as a single pole, single throw switch. Each is normally open or is held open when a positive voltage is applied thereto. When the applied voltage is ground or below ground, the switch is closed.

The signals representing the load (stress) on the load carrying member are sensed by a sensing device 32. This device is preferably a strain gage bridge of conventional design across which the reference voltage VR is applied. The output signal from the strain gage sensing device is amplified in amplifying means 34 having a pre-amplifier stage 36 and a variable gain stage 38. These stages are provided by operational amplifiers 40 and 42. The terminals for connecting the operating voltages $+V$ and $-V$ to the operational amplifiers as well as to the solid state switches 18 to 30 are not shown in order to simplify the illustration. The appropriate connections may be made in the conventional way. An offset voltage is applied to the pre-amplifier stage via a registor 44 connected to VR. This offset voltage and the other offset effects due to the strain gage and the circuits in the amplifier 40 are compensated by a zero set circuit 46. This circuit is provided by an operational amplifier 48 connected as an integrating circuit through the use of a large (e.g., five microfarad) feedback capacitor 50. This integrating circuit is connected in negative feedback relationship with the amplifier 34 by the solid state switch 18 when the zero set mode is selected. A filter circuit of "T" configuration 52 and which includes a shunt capacitor 54 is connected between the preamplifier and adjustable gain stages 36 and 38. A FET transistor switch 56 is connected across the capacitor 54. When the press factor mode is selected to calibrate the instrument for making measurements on a particular machine, the capacitor is shunted by the FET 56 thereby disconnecting the preamplifier stage 36 from the variable gain stage 38 and isolating the variable gain stage.

In the press factor mode a reference voltage is applied to the variable gain stage 38 through a potentiometer 58 which provides the press factor control. The potentiometer 58 provides feedback and variable gain control for the operational amplifier 42 via the switch 16 during the zero set and operating modes. The switch 16 is open during the press factor mode and the reference voltage VR is applied to the ungrounded end of the potentiometer 58 via the switch 30. The output of the amplifier 34 is applied to a cathode ray oscilloscope (CRO) through another amplifier 60.

The press factor voltage, which is applied to the input of the variable gain stage 38 from the wiper of the potentiometer 58, is also observed on a digital indicator 62. This voltage is applied through an amplifier 64 and the switch 26 to the analog input (AIN) of the digital indicator 62. The digital indicator 62 may be a commercially available three digit indicator with decimal point indications between each digit. A suitable indicator is model PCIM-176 sold by Printed Circuits International, Inc. The decimal point (DP) input of the indicator 62 is used for overload indicating purposes as will be more fully described hereafter.

The apparatus is set up so that the reference voltage lever represents full load or rated press capacity. Accordingly, the meter reads a three digit number representing percentage of full capacity. The indication "018" as shown by way of example of the diagram on the indicator 62 represents 18 percent of rated capacity.

After the calibration procedure to set press factor (the press factor mode) is completed, the apparatus is placed in the zero set mode. Then the switch 18 closes and the output of the variable gain stage 38 of the amplifier 34 is integrated in the operational amplifier integrating circuit 48, 50. The operation amplifier is suitably a CMOS type, e.g. Intersil ICL762/BcPu. Inasmuch as the integrating circuit is connected in negative feedback relationship with the amplifier, the offset voltage produced by the integrating circuit is sufficient to reduce the output of the amplifier 34 to zero. This output is connected to the indicator 62 by the switch 20. A zero reading on the indicator and a zero level on the CRO may then be used to verify that a zero set condition has been obtained. It will be noted that the integrating circuit automatically drives the input voltage to the amplifier 34 to a voltage such that the output voltage from the amplifier is at zero. It is necessary only to keep the switch 12 at the zero mode position for a sufficient length of time until zero setting occurs. The time the switch 12 is located at the zero mode position is therefore not critical. When the switch 12 is connected to the operating mode position, the integrating circuit remains connected to the input of the amplifier 34 and maintains the zero set, offset voltage for several minutes thereby enabling a load measurement to be made in the operating mode of the apparatus. It is desirable to use the zero mode to zero set the apparatus when initially setting up the instrument. By zero setting once per minute a maximum error of 1% (one percent) can be obtained.

The peak load measurements are obtained by a peak detector circuit 66. This circuit includes two operational amplifier stages 68 and 70 connected in negative feedback relationship by a resistor 71. A peak detector circuit made up of a diode 72 and a capacitor 73 which is connected to ground through a resistor 74 develops the peak voltage. The amplifier 68 provides filtering and compensation for the voltage drop across the diode 72. The amplifier 70 is a unity gain stage. The capacitor 73 is shunted by a FET transistor 76 which is normally held non-conductive. The peak detector is reset at the beginning of each operating cycle when the signal as obtained from the amplifier 34 corresponds to a certain percentage of the signal level corresponding to full load, i.e. has a predetermined ratio to full load signal level. A suitable ratio or percentage is 12.5%. This percentage is set at an input of an operational amplifier comparator stage 78 by a voltage divider 80 which is connected to VR. A capacitor 82 and a resistor 84 provide a differentiating circuit which translates the positive going edge of the output produced by the comparator 78 when the input thereto reaches 12.5% of full load into a pulse. This pulse renders the FET 76 conductive, discharges the capacitor 73 in the peak detector 66 and resets the peak detector.

The output of the peak detector is applied via the switch 24 in the operating mode to the AIN input of the indicator 62. Accordingly the indicator 62 indicates the peak voltage reached. This indication is presented as a percentage of full load capacity by the three digits displayed. The solid state switch 28 shunts the input of the overload detector 86 to ground during press factor calibration; thus preventing the overload indicator (flashing decimal points) from being enabled.

The overload detector 86 is connected to the decimal point input DP of the indicator 62. The detector 86 includes a comparator operational amplifier stage 88 and an oscillator 90. When the full load output is reached (the peak detector output reaches VR level) the output of the comparator 88 goes positive. This output controls a switching diode 92. The diode will normally shunt the oscillator output pulses from the DP input of the display 62. In the overload condition the diode 92 is open circuited and the positive going pulses of the square wave produced by the oscillator 90 pass through a diode 94 and are applied to the DP input. The decimal points of the display then flash to indicate an overload condition. The operator then can readily observe that an overload has been reached.

Variations and modifications in the herein described apparatus, within the scope of the invention, will undoubtedly suggest themselves to those skilled in the art. Accordingly, the foregoing description should be taken as illustrative and not in a limiting sense.

What is claimed is:

1. Apparatus for measuring the amplitude of an electrical signal produced by a sensing device comprising means for amplifying said signal, means for indicating the amplitude of said amplified signal, signal amplitude holding means selectively connected in feedback relationship with said amplifying means to produce an output driving the amplitude of said signal to zero prior to making a measurement and maintaining said output while said measurement is being made, means selectively connecting the output of said amplifying means to said indicating means prior to the making of said measurement to then indicate that said signal is of zero amplitude prior to the making of said measurement, peak detector means responsive to the amplified signal from said amplifying means for providing an output representing the peak amplitude thereof while said measurment is being made, means for selectively connecting said peak detector means to said indicating means while said measurement is being made, means included in said means for selectively connecting the output of said amplifying means to said indicating means and in said means for selectively connecting said peak detector to said indicating means for disconnecting said output of said amplifier means for said indicating means when said peak detector means is connected thereto, each of said selective connecting means being a solid state switch, and a multi-position switch for applying control levels to said solid state switches.

2. Apparatus for measuring the amplitude of an electrical signal produced by a sensing device comprising means for amplifying said signal, means for indicating the amplitude of said amplified signal, signal amplitude holding means selectively connected in feedback relationship with said amplifying means to produce an output driving the amplitude of said signal to zero prior to making a measurement and maintaining said output while said measurement is being made, said amplifying means including a variable gain amplifier stage, said amplifying means also including a preamplifier stage connected at the input thereof to said sensing device and at the output thereof to the input of said variable gain stage, said signal amplitude holding means being an integrating circuit, first means selectively connecting the input of said integrating circuit to the output of said variable gain stage, second means connecting the output of said integrating circuit to the input of said preamplifier stage, said first and second means being operative to connect said integrating circuit in a negative feedback relationship around said variable gain and preamplifier stages, and means connected between said preamplifier and variable gain stage for selectively shunting the output of said preamplifier from the input of said variable gain stage when the gain of said variable gain stage is varied.

3. Apparatus according to claim 2 further comprising filter means including a capacitor connected in shunt relationship between said preamplifier and variable gain stage, and said selectively shunting means comprising a transistor switch connected across said capacitor, and means for applying a control voltage to said transistor to render it fully conductive when the gain of said variable amplifier stage is to be varied.

4. Apparatus according to any of claims 1, 2 and 3 wherein said measuring apparatus is a load monitoring system for a load carrying member in a press or the like, and said sensing device is strain gage means connected to said member.

5. For use in apparatus for measuring loads which vary during an operational cycle, and responsive to an output signal from a sensing device connected to a load carrying member and having means for amplifying said signal, peak detector means for providing an output signal representing the peak value of the load, means for indicating said peak value, means for setting said apparatus to produce a zero indication from said indicating means prior to an operating cycle, and means for calibrating said apparatus, the improvement which comprises switching means including a plurality of solid stage switches connected to said zero setting means, said peak detector meand and said calibrating means for selectively providing for non-interfering zero setting, calibrating and operating modes of said apparatus.

6. The invention according to claim 5 wherein said switching means includes means for applying control voltages selectively to said solid state switches in different ones of said modes of operation.

7. For use in apparatus in measuring loads which vary during an operating cycle of a machine, such as a press, having a load carrying member and responsive to an output signal from a sensing device connected to said load carrying member and having peak detector means responsive to said output signal, said peak detector means including a capacitor for holding an output corresponding to the peak value of said output signal, the improvement comprising means responsive to said output signal for discharging said capacitor and resetting said peak detector means during each of said operating cycles when the amplitude of said output signal increases to a level which bears a predetermined ratio to full load, and means for indicating said peak value from said peak detector means.

8. The invention according to claim 7 wherein said peak detector means comprises first and second amplifier stages connected in negative feedback relationship, a diode connecting the output of said first amplifier to an input of said second amplifier, said capacitor being connected between said diode and said second amplifier input and in shunt relationship therewith, a transistor switch connected in shunt relationship with said capacitor, means biasing said transistor switch out of conduction, a comparator responsive to said output signal and a voltage corresponding to said level, and means operated by said comparator when said output signal reaches said level for applying a pulse to said transistor switch for rendering it conductive to discharge said capacitor and reset said peak detector means.

9. The invention according to claim 7 wherein said indicating means is a digital having digit and decimal point indicator inputs, means for connecting the output of said peak detector to said digit inputs, a comparator responsive to the output of said peak detector means for providing an overload output when said peak detector means output exceeds a level corresponding to an overload, an oscillator connected to said decimal point input, and means operated by said comparator enabling the output of said oscillator to be applied to said decimal point input.

* * * * *

UNITED STATES PATENT AND TRADEMARK OFFICE
CERTIFICATE OF CORRECTION

PATENT NO. : 4,461,182

DATED : July 24, 1984

INVENTOR(S) : Clarence O. Jones, Jr. and William E. Vosteen

It is certified that error appears in the above-identified patent and that said Letters Patent are hereby corrected as shown below:

Column 1, line 66, after "signal" insert --to--.

Column 2, line 53, change "swithces" to --switches--.

Column 3, line 4, change "registor" to --resistor--.

Column 5, lines 16 and 17 (claim 1), change "measurment" to

--measurement--.

Column 6, line 16 (claim 5), change "meand" to --means--;

line 54 (claim 9), after "digital" insert --display--.

Signed and Sealed this

Twenty-third Day of October 1984

[SEAL]

Attest:

GERALD J. MOSSINGHOFF

Attesting Officer     Commissioner of Patents and Trademarks